Feb. 24, 1948.   T. M. LINVILLE   2,436,654
DYNAMOELECTRIC MACHINE
Filed Dec. 30, 1944

Inventor:
Thomas M. Linville,
by Harry E. Dunham
His Attorney.

Patented Feb. 24, 1948

2,436,654

UNITED STATES PATENT OFFICE 2,436,654

DYNAMOELECTRIC MACHINE

Thomas M. Linville, Schenectady, N. Y., assignor to General Electric Company, a corporation of New York Application December 30, 1944, Serial No. 570,657

11 Claims. (Cl. 171—252)

My invention relates to improvements in dynamoelectric machines and particularly to the ventilating systems for such machines.

An object of my invention is to provide an improved ventilating system for dynamoelectric machines.

Another object of my invention is to provide an improved dynamoelectric machine with arrangements for minimizing the entrance of commutator brush dust into the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
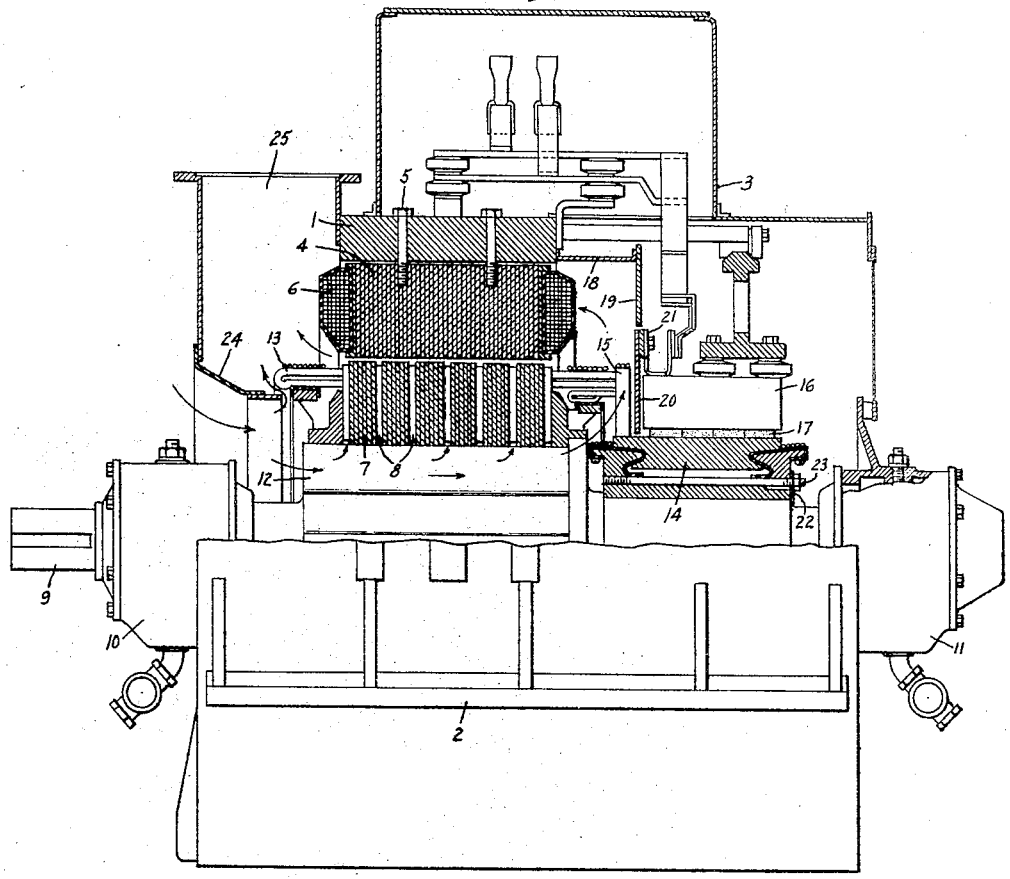
Figure 2:
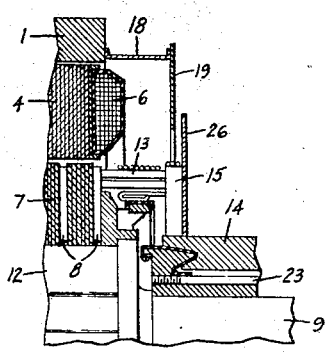
Figure 3:
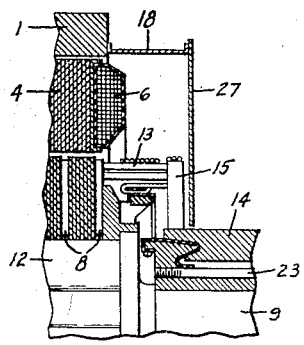

In the drawing, Fig. 1 is a side elevational view, partly in section, of a dynamoelectric machine provided with an embodiment of my invention; Fig. 2 is a partial side elevational view, in section, illustrating another modification of a part of my invention; and Fig. 3 is a partial side elevational view, in section, of a dynamoelectric machine provided with a further modification of a part of my invention.

Referring to the drawing, I have shown an embodiment of my invention applied to a dynamoelectric machine of the commutator type which is adapted to be cooled by the circulation of a ventilating medium, such as air, through the machine. It is often found that commutator temperatures limit the capacity of a machine so that it is desirable that the commutator, as well as the windings and core members of the machine, should be adequately cooled. With commutator machines which utilize carbon brushes, it has been found that the carbon dust which is produced by the wearing of the brushes tends to collect on parts of the machine and decrease the efficiency of the heat transfer from the machine if this dust is permitted to be blown into the machine with the ventilating medium. Furthermore, carbon dust may collect on the commutator risers and on the back of open type commutator leads, lowering the insulation resistance of the machine and necessitating the cleaning of the machine at frequent intervals. My system of ventilation prevents this accumulation of carbon dust and practically eliminates the necessity for cleaning the machine because of the effects of carbon dust.

In Fig. 1 I have shown a dynamoelectric machine provided with a stationary member including a magnet frame 1 provided with supporting feet 2 and an enclosing housing 3. Magnetic excitation is provided to the machine by salient pole pieces 4 secured to the magnet frame 1 in any suitable manner, as by bolts 5 and excited by a field exciting winding 6. A rotatable member is provided which is adapted to react electrodynamically with the stationary member of the machine and includes an armature provided with a laminated core 7 formed of laminations arranged in stacks which are spaced apart by spacer elements 8 to provide radially outwardly extending ventilating passages through the core of the rotatable member. The core is mounted on a shaft 9 supported in suitable bearings 10 and 11 and is formed with axially extending ventilating passages arranged between supporting arms 12 on which the laminated core 7 is mounted. The rotatable member is provided with an armature winding 13 arranged in winding slots in the core 7 and electrically connected to a commutator formed of commutator segments 14 with circumferentially spaced apart risers 15, to which the armature winding 13 is connected. A plurality of suitable brush holders 16 is mounted on the stationary member of the machine and current collector brushes 17 of suitable carbonaceous material are arranged in the brush holders 16 in contact with the outer peripheral surface of the commutator segments 14. In order to minimize the entrance of carbon dust into the risers 15 and into the rotatable and stationary members of the machine, I provide a baffle arrangement which includes a supporting or mounting ring 18 mounted on the magnet frame 1 and a circular plate baffle 19 secured to the mounting member 18 which extends inwardly to adjacent the outer periphery of a second baffle 20. This baffle plate 20 is supported on the brush holders 16 by mounting brackets 21 and extends from adjacent the inner periphery of the baffle 19 to adjacent the outer periphery of the inner end of the commutator on the outer side of the risers 15. In order further to assure against the entrance of carbon dust into the machine, I provide a baffle 22 which is secured over the outer end of the commutator by the commutator bolts 23 and prevents the passage of ventilating medium both through and under the commutator. The ventilating medium is introduced into the machine from the end opposite the commutator and is directed by a ventilating medium conical intake baffle 24 which directs the ventilating medium towards the armature and around the end turns of the armature winding 13 and through the ventilating passages between the supporting arms 12 into the outwardly extending ventilating passages formed by the spacers 8 between the laminations of the core 7 and through the commutator risers 15, as indicated by the arrows in the drawing. The outwardly extending passages formed by the spacers 8 in the core 7 and the spaced apart risers 15 act as fans which impel the ventilating medium over and through the adjacent surfaces of the rotatable member and over the field elements of the stationary member, thereby providing an efficient cooling system which exhausts the ventilating medium into an exhaust scroll 25 secured to the stationary member of the machine at the end thereof away from the commutator. The passage of the ventilating medium between and over the commutator risers 15 provides an efficient cooling of this part of the machine as the heat is readily conducted from the commutator segments 14 to the risers 15 and the fan impeller effect of these risers on the ventilating medium provides for the efficient transfer of the heat from the commutator to the ventilating medium. Thus, I have provided an efficient cooling system for a dynamoelectric machine which substantially prevents the passage of ventilating medium flow from over the commutator into the risers and into the stationary and rotatable members of the machine.

In Fig. 2, I have shown another embodiment of my invention in which parts of the machine are provided with the same reference numerals as similar parts of the machine shown in Fig. 1. In this construction, the baffle arrangement includes a stationary baffle 19 which is supported by the circular baffle 18 similar to the arrangement shown in Fig. 1, except that the length of the circular baffle 18 is slightly less than that shown in Fig. 1, such that the baffle plate member 19 is arranged axially over the commutator risers 15. In this construction, a second baffle member 26 is mounted on the inner end of the outer periphery of the commutator segments 14 adjacent the outer side of the risers 15 and is adapted to rotate with the commutator and extends radially outwardly to provide a slight overlap between the outer edge of the baffle 26 and the inner edge of the baffle 19, with a slight axial clearance therebetween to prevent contact and friction between these two baffles. In some constructions, this has been found preferable to the use of two stationary baffle plates, such as those shown in Fig. 1.

In Fig. 3, I have shown a further modification of my invention in which similar parts are provided with the same reference numerals as those in Figs. 1 and 2, and in this arrangement the baffle system for preventing the entrance of carbon dust into the machine includes a stationary cylindrical mounting baffle member 18 secured to the magnet frame 1 to which a stationary baffle plate 27 is secured which extends from the stationary member mounting plate 18 to adjacent the outer periphery at the inner end of the commutator segments 14 on the outer side of the commutator risers 15 with a slight running clearance between the inner edge of the baffle 27 and the outer periphery of the commutator segments 14 to prevent contact and friction between these members. This is a more simple construction than that shown in Figs. 1 and 2 and may be found to be desirable in some instances.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member provided with a winding and a commutator connected to said winding, means adjacent the outer periphery of the inner end of said commutator for substantially preventing the passage of ventilating medium flow from over said commutator into said stationary member and said rotatable member, a ventilating medium intake at the end of said machine opposite said commutator, and means including spaced risers on said commutator and outwardly extending ventilating passages in said rotatable member for circulating ventilating medium over the winding of said rotatable member, against said stationary member and thence out of said machine.

2. A dynamoelectric machine having a stationary member with a frame and a rotatable member provided with a winding and a commutator having spaced risers connected to said winding, baffle means extending from adjacent the outer side of said risers and the outer periphery of the inner end of said commutator to said frame for substantially preventing the passage of ventilating medium flow from over said commutator into said risers and into said stationary member and said rotatable member, a ventilating medium intake in said stationary member at the end of said machine opposite said commutator, and means including said spaced risers on said commutator and outwardly extending ventilating passages in said rotatable member for circulating ventilating medium through said machine.

3. A dynamoelectric machine having a stationary member and a rotatable member located within said stationary member, said rotatable member being provided with a winding and a commutator connected to said winding, means extending to closely adjacent the outer periphery of the inner end of said commutator for substantially preventing the passage of ventilating medium flow from over said commutator into said stationary member and said rotatable member, a ventilating medium intake at the end of said machine opposite said commutator for directing ventilating medium into said rotatable member and around the adjacent end turns of said rotatable member winding, means including spaced risers on said commutator and outwardly extending ventilating passages in said rotatable member for circulating ventilating medium through said machine, and a ventilating medium exhaust means for said machine.

4. A dynamoelectric machine having a stationary member and a rotatable member provided with a winding and a commutator connected to said winding, means extending to closely adjacent the outer periphery of the inner end of said commutator for substantially preventing the passage of ventilating medium flow from over said commutator into said stationary member and said rotatable member, means for sealing the outer end of said commutator for substantially preventing the passage of ventilating medium through and under said commutator into said rotatable member, a ventilating medium intake including a baffle at the end of said machine opposite said commutator for directing ventilating medium into said rotatable member and around the adjacent end turns of said rotatable member winding, and means including spaced risers on said commutator and outwardly extending ventilating passages in said rotatable member for circulating ventilating medium through said machine.

5. A dynamoelectric machine having a stationary member and a rotatable member provided with a winding and a commutator connected to said winding, means extending to closely adjacent the outer periphery of the inner end of said commutator for substantially preventing the passage of ventilating medium flow from over said commutator into said stationary member and said rotatable member, means for sealing the outer end of said commutator for substantially preventing the passage of ventilating medium through and under said commutator into said rotatable member, a ventilating medium intake in said stationary member at the end of said machine opposite said commutator for directing ventilating medium into said rotatable member and around the adjacent end turns of said rotatable member winding, means including spaced risers on said commutator and outwardly extending ventilating passages in said rotatable member for circulating ventilating medium through said machine, and a ventilating medium exhaust means at the end of said machine away from said commutator.

6. A dynamoelectric machine having a stationary member with a frame and a rotatable member provided with a winding and a commutator having spaced risers connected to said winding, means including a baffle extending outwardly from the outer periphery of the inner end of said commutator and a baffle on said stationary member frame extending substantially to said first-mentioned baffle for substantially preventing the passage of ventilating medium flow from over said commutator into said risers and into said stationary member and said rotatable member, a ventilating medium intake at the end of said machine opposite said commutator for directing ventilating medium into said rotatable member and around the adjacent end turns of said rotatable member winding, means including said spaced risers on said commutator and outwardly extending ventilating passages in said rotatable member for circulating ventilating medium through said machine, and a ventilating medium exhaust means for said machine.

7. A dynamoelectric machine having a stationary member with a frame and a rotatable member provided with a winding and a commutator having spaced risers connected to said winding, means including a baffle extending outwardly from the outer periphery of the inner end of said commutator and a baffle on said stationary member frame extending substantially to said first-mentioned baffle for substantially preventing the passage of ventilating medium flow from over said commutator into said risers and into said stationary member and said rotatable member, means for sealing the outer end of said commutator for substantially preventing the passage of ventilating medium through and under said commutator into said rotatable member, a ventilating medium intake at the end of said machine opposite said commutator for directing ventilating medium into said rotatable member and around the adjacent end turns of said rotatable member winding, means including said spaced risers on said commutator and outwardly extending ventilating passages in said rotatable member for circulating ventilating medium through said machine, and a ventilating medium exhaust means at the end of said machine away from said commutator.

8. A dynamoelectric machine having a stationary member with a frame and a rotatable member provided with a winding and a commutator having spaced risers connected to said winding, stationary brush holders, means including a baffle extending to closely adjacent the outer periphery of the inner end of said commutator mounted on the inner side of said brush holders and a baffle on said stationary member frame extending substantially to said first-mentioned baffle for substantially preventing the passage of ventilating medium flow from over said commutator into said risers and into said stationary member and said rotatable member, means for sealing the outer end of said commutator for substantially preventing the passage of ventilating medium through and under said commutator into said rotatable member, a ventilating medium intake at the end of said machine opposite said commutator for directing ventilating medium into said rotatable member and around the adjacent end turns of said rotatable member winding, and means including said spaced risers on said commutator and outwardly extending ventilating passages in said rotatable member for circulating ventilating medium through said machine.

9. A dynamoelectric machine having a stationary member with a frame and a rotatable member provided with a winding and a commutator having spaced risers connected to said winding, stationary brush holders, means including a baffle extending to closely adjacent the outer periphery of the inner end of said commutator mounted on the inner side of said brush holders and a baffle on said stationary member frame extending substantially to said first-mentioned baffle for substantially preventing the passage of ventilating medium flow from over said commutator into said risers and into said stationary member and said rotatable member, a ventilating medium intake at the end of said machine opposite said commutator for directing ventilating medium into said rotatable member and around the adjacent end turns of said rotatable member winding, and means including said spaced risers on said commutator and outwardly extending ventilating passages in said rotatable member for circulating ventilating medium through said machine.

10. A dynamoelectric machine having a stationary member with a frame and a rotatable member provided with a winding and a commutator having spaced risers connected to said winding, stationary brush holders, means including a baffle extending outwardly from the outer periphery of the inner end of said commutator and a baffle on said stationary member frame extending substantially to said first-mentioned baffle for substantially preventing the passage of ventilating medium flow from over said commutator into said risers and into said stationary member and said rotatable member, means for sealing the outer end of said commutator for substantially preventing the passage of ventilating medium through and under said commutator into said rotatable member, a ventilating medium intake at the end of said machine opposite said commutator for directing ventilating medium into said rotatable member and around the adjacent end turns of said rotatable member winding, and means including said spaced risers on said commutator and outwardly extending ventilating passages in said rotatable member for circulating ventilating medium through said machine.

11. A dynamoelectric machine having a stationary member with a frame and a rotatable member located within said stationary member, said rotatable member being provided with a winding and a commutator having spaced risers connected to said winding, means including a baffle extending to closely adjacent the outer periphery of the inner end of said commutator on the outer side of said risers to said frame for substantially preventing the passage of ventilating medium flow from over said commutator into said risers and into said stationary member and said rotatable member, means for sealing the outer end of said commutator for substantially preventing the passage of ventilating medium through and under said commutator into said rotatable member, a ventilating medium intake including a second baffle arranged at the end of said machine opposite said commutator for directing ventilating medium into said rotatable member and around the adjacent end turns of said rotatable member winding, means including outwardly extending ventilating passages in said rotatable member for circulating ventilating medium through said machine, means including said spaced risers on said commutator for effecting heat transfer from said commutator to said ventilating medium, and a ventilating medium exhaust means at the end of said machine away from said commutator.

THOMAS M. LINVILLE.

REFERENCES CITED

The following references are of record in the file of this patent:

UNITED STATES PATENTS

| Number | Name | Date |
|---|---|---|
| 737,253 | Lindenberger | Aug. 25, 1903 |
| 1,399,832 | Wait | Dec. 13, 1921 |
| 1,684,168 | Bethel | Sept. 11, 1928 |
| 2,284,656 | Heter | June 2, 1942 |

FOREIGN PATENTS

| Number | Country | Date |
|---|---|---|
| 272,292 | Great Britain | June 13, 1927 |
| 273,084 | Great Britain | June 30, 1927 |